Feb. 9, 1971   R. G. MAHER   3,562,049
METHOD OF MAKING A MOLD
Filed Oct. 26, 1967   2 Sheets-Sheet 1
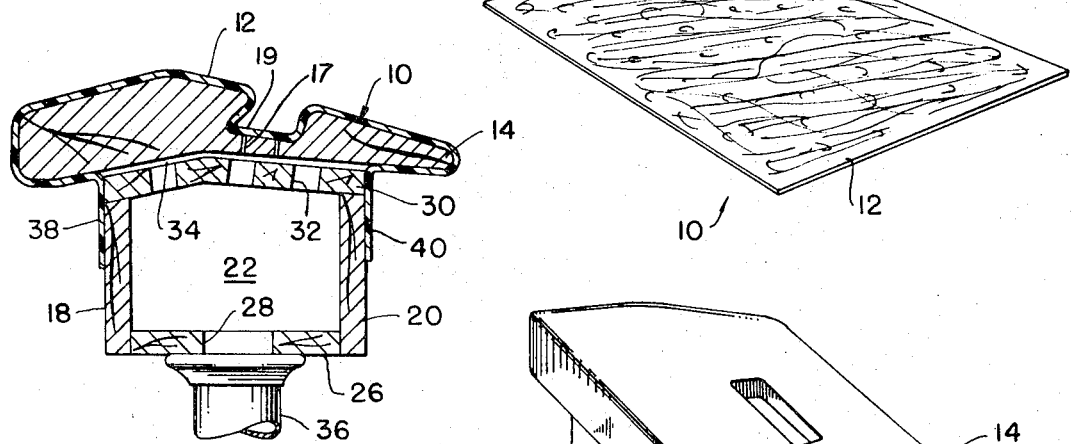
FIG.1
FIG.3
FIG.2
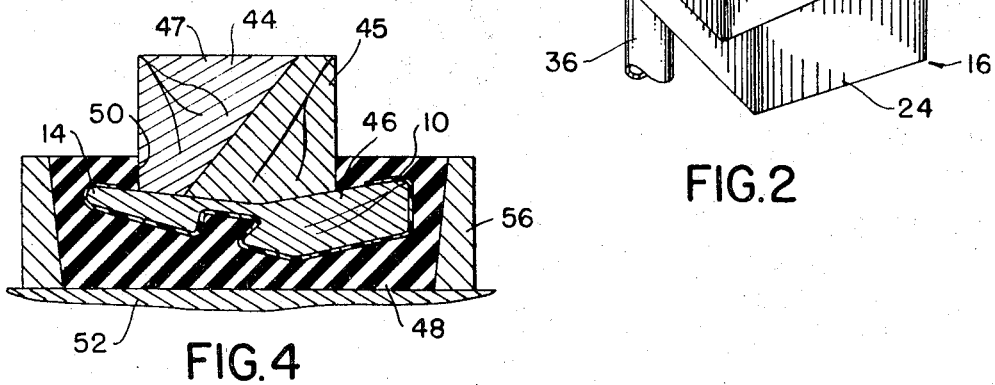
FIG.4
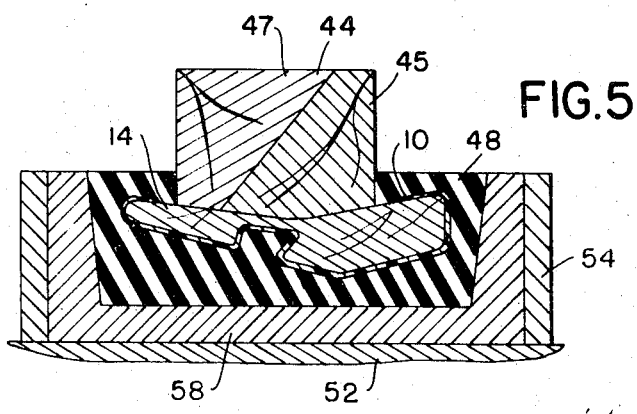
FIG.5
INVENTOR
RICHARD G. MAHER
BY
ATTORNEYS

INVENTOR
RICHARD G. MAHER

ATTORNEYS

United States Patent Office 3,562,049
Patented Feb. 9, 1971

3,562,049
METHOD OF MAKING A MOLD
Richard G. Maher, Detroit, Mich., assignor to Maher Pattern Company, Warren, Mich., a corporation
Filed Oct. 26, 1967, Ser. No. 678,404
Int. Cl. B29c 17/00
U.S. Cl. 156—213      12 Claims

ABSTRACT OF THE DISCLOSURE

The method comprises making a rigid mold from a rigid pattern, without, in the course of making the rigid mold, destroying the rigid pattern. In the method, the rigid pattern is first formed of a material such as wood. It is desired that the final mold have a cavity with a textured surface to simulate a material such as grained leather. Consequently, a sheet of plastic material having the desired textured surface on one face thereof is formed around the pattern by use of heat and allowed to set to form the desired textured surface exteriorly of the pattern. A flexible mold of a material such as rubber is then formed around the pattern. The pattern is removed from the flexible mold without damage to either the pattern or the mold. A second pattern of flexible material such as rubber is then formed in the first mold. The flexible pattern and flexible mold may be separated without destroying either. Finally, a desired rigid mold is formed around the flexible pattern by laminating alternate layers of resin and glass fibre thereon. The flexible pattern is removable from the rigid mold whereupon the rigid mold is ready for use in casting.

BACKGROUND OF THE INVENTION

Safety requirements for automobiles have recently been inaugurated. One of the requirements is that panels which may be struck by the body of an occupant of a vehicle must be padded in order to reduce injury to a person striking the panel as a result of an automobile accident. One technique for manufacturing padded panels is to first cast in a mold a plastic skin in the shape of the panel. The plastic skin normally has a textured surface such as a leather grain thereon in order to simulate an appearance of leather in the vehicle. The skin is subsequently filled with foam plastic or rubber material and a metal insert, which serves as a support and mounting element is placed therein to form the final panel.

Difficulty has been experienced in manufacturing the molds for casting the plastic skins. The conventional process is expensive, time consuming and difficult. This process comprises first constructing a rigid pattern of, for example, wood, then applying a sheet of plastic material around the pattern, the sheet having the desired textured surface, and then forming a mold of rubber around the pattern. The pattern is removed and the mold is used to form a plastic pattern. The plastic pattern has the desired textured surface on the exterior thereof. The plastic pattern is then used as a mandrel for metal plating. The pattern is first coated with a silver nitrate material which makes it receptive to plating. Conventionally, the plating is done by electro-forming. A layer of nickel of approximately .040 inch and a layer of copper of approximately the same thickness is plated on to the plastic pattern. The pattern is then chipped out leaving a mold having a cavity in the shape of the desired panel and which has a textured cavity surface. This relatively fragile mold is then supported by framing structure. The framing structure is secured to the mold by silver solder. The entire process is not only expensive but time consuming, the plating operation alone requiring about ten days. Further, such molds are easily damaged and it has been difficult to achieve the desired plating with a uniform thickness.

The present invention provides a much quicker, less expensive, simple technique for manufacturing the desired molds.

SUMMARY OF THE INVENTION

In the method for making a mold, the first step is to construct a rigid pattern. A skin having an exterior textured surface is then formed around the pattern. The pattern is then used to form a flexible mold. The flexible mold may be fabricated of, for example, rubber. The flexible mold is then used to make another pattern which is also flexible. The flexible pattern may also be fabricated of, for example, rubber. Finally, a rigid mold is formed around the flexible pattern. The rigid mold may be a resin-glass fibre laminated structure. The flexible pattern is then removed from the rigid mold whereupon the mold is ready for use.

In the drawings:

FIG. 1 is a view in perspective of a sheet of vinyl material having a grained surface on one side thereof;

FIG. 2 is a view in perspective of a wood pattern utilized in the first step of the invention;

FIG. 3 is a sectional view of the pattern of FIG. 2 illustrating the forming of a vinyl skin on the outer surface thereof;

FIG. 4 is a sectional view illustrating the forming of a rubber mold using the pattern with the vinyl skin therein as in FIG. 3;

FIG. 5 illustrates the step of encasing the mold of FIG. 4 in a rigid plaster retainer;

Figure 7:
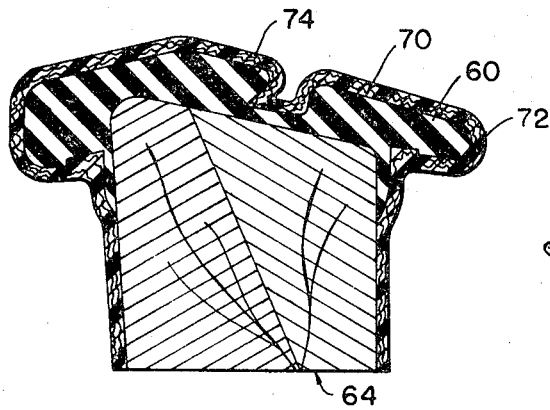
FIG. 7 illustrates the formation of a rigid laminated mold utilizing the rubber pattern formed by the step of FIG. 6.

Referring to FIG. 1, a sheet 10 of vinyl plastic material is illustrated. Such a vinyl plastic material is widely used in the automotive industry for upholstering vehicle interiors. Vinyl sheet is used, for example, for cushions, padded dashboard panels, door panels and the like. Vinyl plastic is used most often because of its desirable characteristics as an upholstering material. However, the present invention is not restricted to the use of a vinyl plastic.

One surface 12 of the sheet 10 has impressed thereon a textured surface in the form of a grained pattern which simulates natural leather. It is considered highly desirable in the automotive industry to provide some such textured surface in order to produce a pleasing appearance. The pattern is not necessarily restricted to a grained design, other patterns being possible. In addition to a natural grain appearance, it is also frequently desired to provide a stitched effect on the surface to simulate upholstery stitching. The sheet 10 is utilized as a form to ultimately produce a mold having the desired graining effect of the surface 12.

Referring now to FIG. 2, a wooden pattern 14 is constructed in the conventional manner in the shape of a panel which, in the instant case, is utilized as the exterior panel of a vehicle ash tray. A vacuum chamber structure 16 is provided on the underside of the pattern 14. The chamber structure 16, as shown in FIGS. 2 and 3, comprises a boxlike member having solid side and end walls 18, 20, 22, 24, a bottom wall 26 with an opening 28 centrally thereof and a top wall 30 which has a plurality of spaced apart openings 32 provided over the entire area thereof. The pattern 14 is supported on the chamber 16 slightly thereabove leaving a space therebetween. A conduit 36 extends from the opening 28 in the bottom wall 26 and is connected to a negative pressure source.

In the first step of making the mold in accordance with the present invention, the sheet 10 is heated until it reaches a pliable state wherein it may be permanently deformed. It is then layed on top of the pattern 14. A negative pressure is then applied to the interior of chamber structure 16 via the conduit 36. Air is drawn through the openings 32 from the space 34 beneath the pattern. This causes the marginal edge portions 38, 40 on each side of the sheet 10 and the end marginal edges (not shown) to be drawn beneath the pattern and against the chamber structure 16 to seal the space between the pattern and the chamber. This results in the sheet 10 being drawn around all the lower corners and edges of the pattern. Openings 17 are provided in the central portion of the pattern in order to draw the sheet 10 into the recess 19. The vacuum created within the chamber 16 results in the sheet 10 forming a smooth skin around the entire top and sides and a portion of the bottom of the pattern 14.

After the sheet 10 has been formed into a skin around the pattern 14, it is allowed to cool and permanently set in the shape illustrated in FIG. 3. It will be appreciated that the grained surface 12 faces outwardly so that this surface can subsequently be used in the mold-making process. After the sheet 10 has cooled, the marginal edge portions are trimmed away and the pattern 14 is removed from the chamber 16.

Then, as shown in FIG. 4, a support block structure 44 is provided at the undersurface 46 of the pattern 14. The assembly is then utilized to produce a rubber mold 48 as illustrated in FIG. 4. The block structure 44 comprises two mating blocks 45, 47 having angularly related faces which permit one of the blocks 47 to be slid upwardly and sidewardly for easy removal after the mold 48 has been formed. More than two blocks may be used depending upon the shape of the mold cavity. In the making of the mold 48, liquid rubber is first evenly applied around the entire surface of the pattern 14 as a relatively thin layer. This may be accomplished by dipping, spraying or pouring the rubber onto the pattern. After the first layer has been set up and becomes tacky, a second layer may be applied in the same fashion. Third and fourth layers may also be utilized. The reason for applying the first layer so carefully is so that the interior cavity of the mold 48 will have fine detail of the exterior of the pattern including the grained surface of the vinyl sheet 10.

Once the thin layers have been applied to the pattern to result in a firm, stable exterior skin, the block 44 is projected through an opening 50 in a flat support member 52 with the pattern 14 being positioned thereabove.

A mold 56 in the shape of an open-ended frame is then set on the support structure 52 and liquid rubber is poured into the cavity defined by the mold 56, pattern 14, and support member 52 to fill the cavity as illustrated. This rubber is preferably filled, as with sawdust, in order to reduce the cost.

After the rubber has set to form the first mold 48, a second frame-type mold 54 of larger dimensions than the mold 56 is placed around the rubber mold 48. Plaster of the ordinary wet-type is poured into the mold to encompass the rubber mold 48 and define a rigid retainer 58. The function of the retainer 58 is to prevent the mold 48 from flexing or deforming when it is subsequently used to make an additional rubber mold. After the retainer 58 has set, the mold 56 and retainer 58 are removed from the mold 48. This permits the mold 48 to be flexed for removal of the pattern 14.

Figure 6:
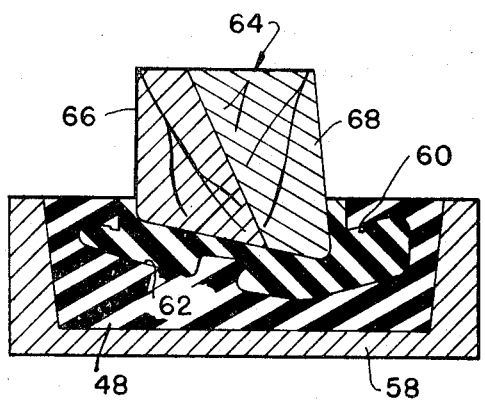
FIG. 6 illustrates the step of forming a rubber pattern by use of the rubber mold formed in FIG. 4.

After the pattern 14 has been removed from the mold 48, the mold 48 is again placed in retainer 58 and this assembly is used, as shown in FIG. 6, to make a rubber pattern 60. It will be appreciated that the surface 62 of the cavity within the mold 48 has a reverse or mirror image of the pattern of the vinyl sheet 10. That is, an indentation on the sheet 10 would appear as a projection on the surface 62 and alternately, a projection of the sheet 10 would appear as an indentation on the surface 62.

Before the cavity of the mold 48 is filled with liquid rubber, a support block structure 64 is partially inserted into the mold cavity. The block structure 64 comprises two mating blocks 66, 68 having angularly related faces which permit one of the blocks 68 to be slid upwardly and sidewardly for easy removal after the pattern 60 has been formed. With the blocks 66, 68 in place, liquid rubber is poured into the mold 48 and allowed to set. After the rubber has set, the blocks 66, 68 are removed. The pattern 60 may then be removed.

Then, as shown in FIG. 7, the blocks 66, 68 are reinserted into the pattern 60 and form a firm foundation or base for the pattern to prevent undue flexing or deformation of the pattern during the next step of the invention. It will be appreciated that the exterior surface 70 of the pattern 60 is an exact replica of the exterior surface 12 of the original vinyl sheet 10.

Figure 8:
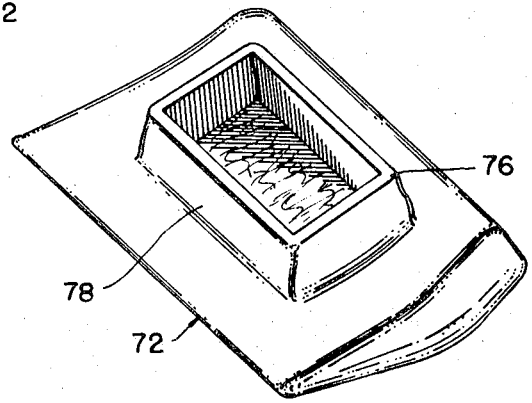
FIG. 8 is a view in perspective of the mold formed in FIG. 7.

The final mold 72 is constructed by laminating glass fibre cloth and plastic around the exterior of the pattern 60. The first layer of resin, preferably an epoxy resin, is applied to the exterior surface of the pattern 60. This layer will have, on the interior surface 74, an exact opposite replica of the grained pattern on the surface 70 of the pattern 60, as previously described in connection with the mold 48. After the first layer has become tacky, a layer of glass fibre is applied around the pattern 60. This is followed by a second layer of resin and another layer of glass fibre in the usual laminating process until the final desired thickness of the mold 72 has been achieved. After the resin has set up, the blocks 66, 68 and pattern 60 are removed, whereupon the mold 72 is ready for use, as illustrated in FIG. 8.

Figure 9:
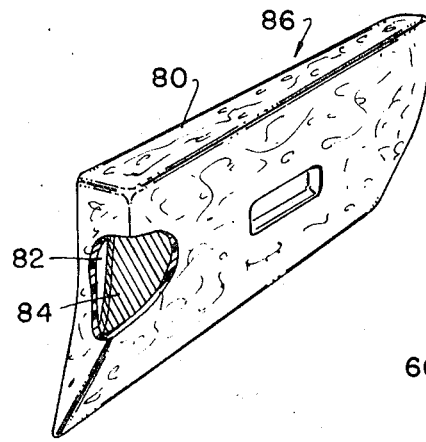
FIG. 9 is a view in perspective with portions cut away for the purpose of clarity of a panel formed by use of the mold of FIG. 8.

The mold 72 is subsequently used in an automatic casting process. In the process, the mold is mounted on a machine along with a plurality of other molds of the same design. A metered amount of a liquid vinyl resin material is injected into the mold and a sealing cover is applied over the mouth 76. The mold is heated and simultaneously revolves on various axes whereupon the liquid resin material flows over the interior surface of the mold and is caused to cure by the heat. A thin skin is ultimately formed on the interior of the mold. After the skin has formed, it is removed from the mold. The material of the skin defined by the neck 78 of the mold is trimmed off. The thus formed skin 80, as shown in FIG. 9, is then placed in another mold. A metal insert 82 is positioned within the skin and the skin is filled with a foamed plastic material 84 to form the final member 86 which, in the present case, is utilized as the exterior panel for a vehicle ash tray. The mold may also be used in other production casting methods such as the "dump-and-fill" process.

The mold 72, during the process of casting the skin 80, is raised to a temperature in the range of 350° F. In order for the mold to withstand this temperature, it must be tempered by subjecting it to heat of approximately 450° F. Conventionally, such molds have been tempered by slowly raising the mold to the ultimate tempering temperature. In the past, the mold has been positioned within a furnace and an operator has caused the furnace temperature to raise incrementally over an extended period of time. As will be appreciated, this process is time consuming and expensive. In accordance with the present invention, it has been found that it is possible to immerse a mold, at room temperature, into a salt bath. The bath may be, for example, a sodium cyanide mixture (30% sodium cyanide, 40% sodium carbonate, 30% sodium chloride) or other suitable salt bath composition as desired. The salt bath is at the ultimate temperature. When the relatively cold mold is immersed in the bath, a part of the salt crystallizes on the exterior surface thereof. This layer of salt crystals acts as an insulator and prevents rapid rise in temperature of the mold. This avoids cracking or other damage to the mold as a result of rapid heating. When the mold temperature is sufficiently elevated, the salt crystals on the surface thereof melt and again go into solution in the bath. After a suitable length of time, the mold is removed. The mold may be cooled at room temperature without damage to it. Curing the mold by this process requires about one (1) hour. This is compared to curing in a furnace which requires approximately ten (10) hours. As will be appreciated, the salt bath method of curing is much less expensive than the furnace technique and is less time consuming.

The mold of the present has a number of advantages over prior art molds. Firstly, the walls of the mold are relatively thick. As a consequence, material may be removed from the walls without damaging the mold. Removal of material is necessary in some cases in order to perfect the skin which is cast within the mold. The thickness of the skin may vary at the corners and various recesses or other irregularities in the skin shape if the mold has a constant thickness. It is desired to maintain the thickness of the skin constant. When material is removed from the mold, the heat transfer characteristics of the mold are altered. These alterations affect the formation of the skin. As a consequence, after tryout, areas where the skin is formed of a less thickness may be determined. Removal of some of the mold material to reduce the thickness of the mold at these points results in increasing the thickness of the skin when cast. This is not possible with prior art molds because the thickness of the molds was not sufficient to permit removal of any of the material thereof.

The plastic nature of the mold is also advantageous in that it does not require any expensive machining at the area of the mouth 76 in order to form a satisfactory seal with the cover which is applied thereover during the casting process. The plastic nature of the mold tends to result in a satisfactory seal even if the mold mouth is not perfect. The plastic tends to soften at the high temperatures used in the casting process. A slight tackiness develops and this results in a good seal with the metal sealing cover. The prior art molds were constructed of metal, and as is well known, it is difficult to achieve a satisfactory seal with metal.

What I claim as my invention is:

1. A method for making a mold including a mold cavity having a surface configuration preventing withdrawal of a rigid pattern therefrom comprising the steps of first constructing a first rigid pattern having an exterior textured surface therearound, forming a first mold of flexible material around the first pattern, removing the first pattern from the first mold, forming a second pattern of flexible material in said first mold, removing the second pattern from the first mold, forming a second mold of rigid material around the second pattern, and removing the second pattern from the second mold whereby the second mold has an interior mold cavity in the shape of the first pattern with a textured surface which is the mirror image of the exterior textured surface of the first pattern.

2. The method in accordance with claim 1 and further characterized in that the exterior textured surface on the first pattern is formed by a resinous skin which is applied by providing a flat sheet of resinous material having a textured surface, heating said sheet and forming it around the first pattern, and then allowing the sheet to cool and permanently set in the shape of the pattern.

3. The method in accordance with claim 2 and further characterized in that the resinous sheet is formed around the first pattern by means of a vacuum applied to the undersurface of the resinous sheet.

4. The method in accordance with claim 1 and further characterized in the step of forming a rigid retainer around said first mold to prevent flexing of said mold during the formation of the second pattern.

5. The method in accordance with claim 4 and further characterized in that said rigid retainer is formed around the first mold while the first mold still encompasses the first pattern, said retainer being removed from the first mold prior to removal of the first pattern from the first mold and replaced on the first mold prior to formation of the second pattern.

6. The method in accordance with claim 1 and further characterized in that during the step of forming the second pattern a rigid support structure is provided in the center of the first mold cavity and spaced from the walls thereof, said second pattern being formed within the cavity and around the support structure, removing said support structure prior to removal of the second pattern from the first mold and replacing said support structure prior to forming said second mold, the support structure being formed of a plurality of members having angularly related mating faces, said members being removed and replaced one at a time, at least one of the members being removed or replaced in a direction sidewardly and outwardly to avoid damage to the second pattern.

7. The method in accordance with claim 1 and further characterized in that the second mold is formed by laminating alternate layers of resin and foraminous material around the second pattern.

8. The method of claim 7 and further characterized in that the first material applied to the second pattern in the laminating process is a layer of resinous material.

9. The method of claim 7 and further characterized in that the second mold is tempered at an elevated temperature after formation thereof, said tempering being accomplished by immersing the mold at substantially room temperature into a salt bath which is at the elevated tempering temperature whereupon salt crystals form an insulating layer around the surface of the second mold, and retaining the second mold in the salt bath for a period sufficient to cause tempering thereof.

10. A method of making a rigid mold having a mold cavity having a surface configuration preventing withdrawal of a rigid pattern therefrom and the surface of which is textured from a flexible mold having a mold cavity the surface of which is textured, comprising the steps of forming a pattern of flexible material in said flexible mold, removing the pattern from the flexible mold, and forming a rigid mold around the flexible pattern and then removing the flexible pattern from the rigid mold.

11. The method of claim 10 and further characterized in that the rigid mold is formed by laminating alternate layers of resin and foraminous material around the flexible pattern.

12. A method for making a mold including a mold cavity having a surface configuration preventing withdrawal of a rigid pattern therefrom comprising the step of first constructing a first rigid pattern, forming a first mold of flexible material around the first pattern, removing the first pattern from the first mold, forming a second pattern of flexible material in said first mold, removing the second pattern from the first mold, forming a second mold of rigid material around the second pattern, and removing the second pattern from the second mold whereby the second mold has an interior mold cavity in the shape of the first pattern.

References Cited

UNITED STATES PATENTS

| | | | |
|---|---|---|---|
| 1,986,637 | 1/1935 | L'Hollier | 264—227 |
| 2,019,590 | 11/1935 | Westra | 264—220 |
| 2,316,143 | 4/1943 | Peebles | 264—220 |
| 2,781,077 | 2/1957 | Dovido | 156—213 |
| 3,317,178 | 5/1967 | Kreier, Jr. | 17—47(M) |
| 3,379,812 | 4/1968 | Yakovou | 264—227 |

SAMUEL W. ENGLE, Primary Examiner

U.S. Cl. X.R.

156—245; 264—227